United States Patent
Leach

(10) Patent No.: US 12,502,016 B1
(45) Date of Patent: Dec. 23, 2025

(54) TACO HOLDER

(71) Applicant: Catherine Leach, League City, TX (US)

(72) Inventor: Catherine Leach, League City, TX (US)

( * ) Notice: Subject to any disclaimer, the term of this patent is extended or adjusted under 35 U.S.C. 154(b) by 0 days.

(21) Appl. No.: 19/052,161

(22) Filed: Feb. 12, 2025

(51) Int. Cl.
  *A47G 19/30* (2006.01)
  *A47G 19/02* (2006.01)
  *A47G 21/00* (2006.01)

(52) U.S. Cl.
  CPC ........... *A47G 21/001* (2013.01); *A47G 19/02* (2013.01)

(58) Field of Classification Search
  CPC ............... A47G 21/001; A47G 19/02
  USPC ........................... D7/504; 211/85.4
  See application file for complete search history.

(56) References Cited

U.S. PATENT DOCUMENTS

| | | | | |
|---|---|---|---|---|
| D219,163 S | * | 11/1970 | Welsh | D7/622 |
| D225,363 S | * | 12/1972 | Welsh | D7/622 |
| 4,270,660 A | | 6/1981 | Pitt | |
| 4,501,367 A | | 2/1985 | Potts | |
| 4,603,825 A | | 8/1986 | Kotliar | |
| 4,746,010 A | | 5/1988 | Fournier | |
| 4,872,566 A | | 10/1989 | Alsup | |
| 4,925,032 A | | 5/1990 | Liles | |
| 5,065,870 A | | 11/1991 | Conder, Jr. | |
| D423,823 S | * | 5/2000 | Nelson | D34/5 |
| D515,868 S | * | 2/2006 | McRoberts | D7/504 |
| D779,271 S | | 2/2017 | Simon | |
| D900,549 S | | 11/2020 | Chapman | |
| D908,437 S | * | 1/2021 | Alanis | D7/602 |
| D966,815 S | | 10/2022 | Spruell | |
| D1,025,705 S | | 5/2024 | Gilmore | |
| D1,030,412 S | | 6/2024 | Gilmore | |
| 2005/0023234 A1 | | 2/2005 | Head | |
| 2022/0400881 A1 | | 12/2022 | Mitchell | |

\* cited by examiner

*Primary Examiner* — Andrew D Perreault
(74) *Attorney, Agent, or Firm* — Cramer Patent & Design, PLLC.; Aaron R. Cramer

(57) ABSTRACT

A taco holder is configured to hold a taco upright and parallel to a support surface during filling or consumption. The taco holder comprises a tapered frusto-conical body defining an interior, with a larger open top end and a smaller closed bottom end featuring a planar bottom wall for stability. The holder includes a pair of diametrically-opposed trapezoidal cut-outs with horizontal edges for supporting a taco. The structure is divided into side wall first portions adjacent to the cut-outs and side wall second portions located below them. The holder's geometry allows for nesting multiple units, enabling space-saving storage. Constructed from materials suitable for single or repeated use, the taco holder provides a convenient, hands-free solution for filling tacos while capturing dropped fillings and maintaining cleanliness.

1 Claim, 3 Drawing Sheets

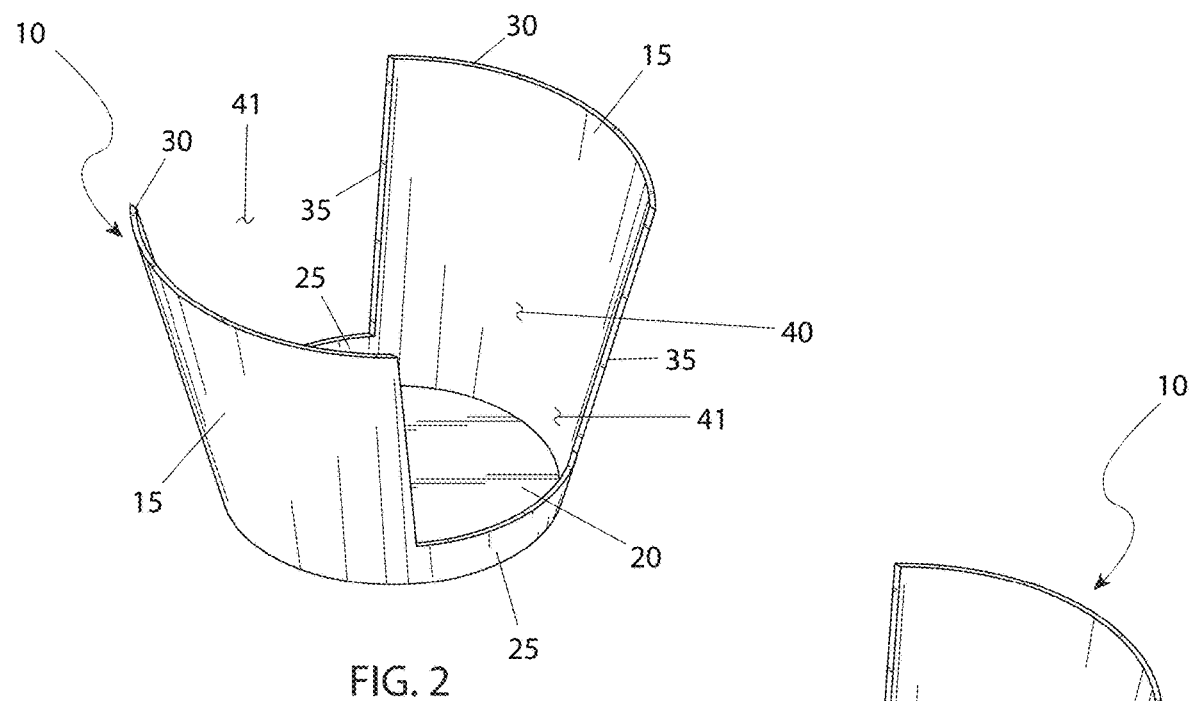
FIG. 2
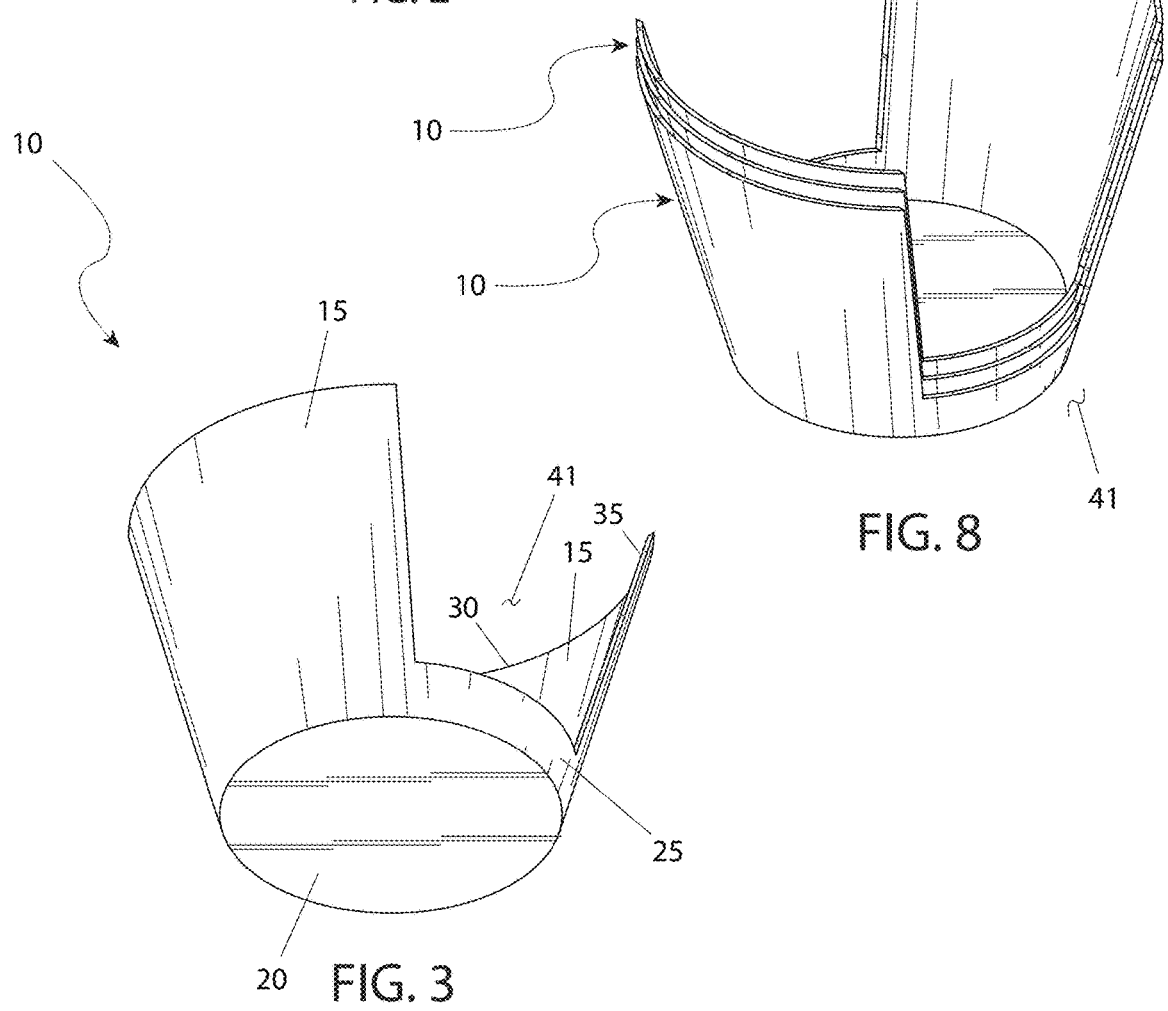
FIG. 8
FIG. 3

TACO HOLDER

RELATED APPLICATIONS

Not applicable.

FIELD OF THE INVENTION

The presently disclosed subject matter is directed to a taco holder configured to hold tacos in an upright position on a support surface, such as a table or countertop. The taco holder features a tapered frusto-conical body, cut-outs designed to accommodate taco shells, and a structure enabling space-saving nested storage. The invention is particularly useful during the taco filling or consumption process, providing hands-free convenience and minimizing mess.

BACKGROUND OF THE INVENTION

Traditional methods of filling and consuming tacos often involve holding the taco by hand, which can be inconvenient and messy, particularly as taco fillings tend to spill or cause the shell to tip over. Existing taco holders either lack structural stability, fail to accommodate a variety of taco sizes, or are not optimized for efficient storage. Additionally, many available taco holders are made from non-sustainable materials, contributing to environmental waste. Accordingly, there is a need for an improved taco holder that securely holds tacos upright during filling and consumption, reduces mess, supports sustainable practices, and is compact for storage when not in use. The presently disclosed taco holder addresses these issues with a novel design that is practical, efficient, and environmentally friendly.

SUMMARY OF THE INVENTION

Embodiments of the present disclosure include a taco holder configured to support a taco in an upright position on a support surface. The taco holder features a tapered frusto-conical body defining an interior, with an open top end of larger diameter and a closed bottom end of smaller diameter. A planar bottom wall is disposed at the closed bottom end, providing stability when placed on a support surface.

The taco holder further includes a holder rim edge located at the terminal upper end of the open top. A pair of diametrically-opposed cut-outs are formed in the tapered frusto-conical body, each extending downward from the holder rim edge and terminating prior to reaching the planar bottom wall. These cut-outs are defined by holder cut-out edges and have a generally trapezoidal shape, with horizontal bottom edges parallel to the planar bottom wall.

The structure includes a pair of side wall first portions, each spanning vertically between the holder rim edge and the planar bottom wall and bordered by the respective cut-outs. Below the cut-outs, the taco holder comprises a pair of side wall second portions.

In some embodiments, the tapered frusto-conical body is configured to allow nested stacking with other taco holders of identical size for compact storage. The cut-outs may be dimensioned to accommodate a taco shell such that the distal ends of the taco shell rest on the horizontal bottom edges of the cut-outs while the taco is suspended above the planar bottom wall within the interior.

The taco holder may be made from materials selected from plastic, processed paper, cardboard stock, or biodegradable materials. In some embodiments, the material composition is dishwasher-safe to facilitate reuse. Additionally, the planar bottom wall may be configured to capture filling material that falls from the taco during use, contributing to cleanliness. The holder cut-out edges further prevent the taco from tipping or moving laterally when retained within the interior.

The tapered frusto-conical body provides structural rigidity and stability, enabling the taco holder to support tacos of varying sizes. The horizontal bottom edges of the cut-outs may also support other edible items, such as sandwiches, wraps, or similar foods. In some embodiments, the taco holder is constructed from biodegradable materials to reduce environmental waste when discarded. The holder rim edge reinforces the open top end, preventing deformation during stacking or handling.

Embodiments of the present disclosure may also include a system for space-saving storage, comprising a plurality of taco holders. The tapered frusto-conical geometry of each taco holder enables nesting of the taco holders within one another for compact and efficient storage.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is a top front isometric view of the taco holder 10, according to an embodiment of the present invention;

FIG. 3 is a bottom rear isometric view of the taco holder 10, according to an embodiment of the present invention;

Figure 1:
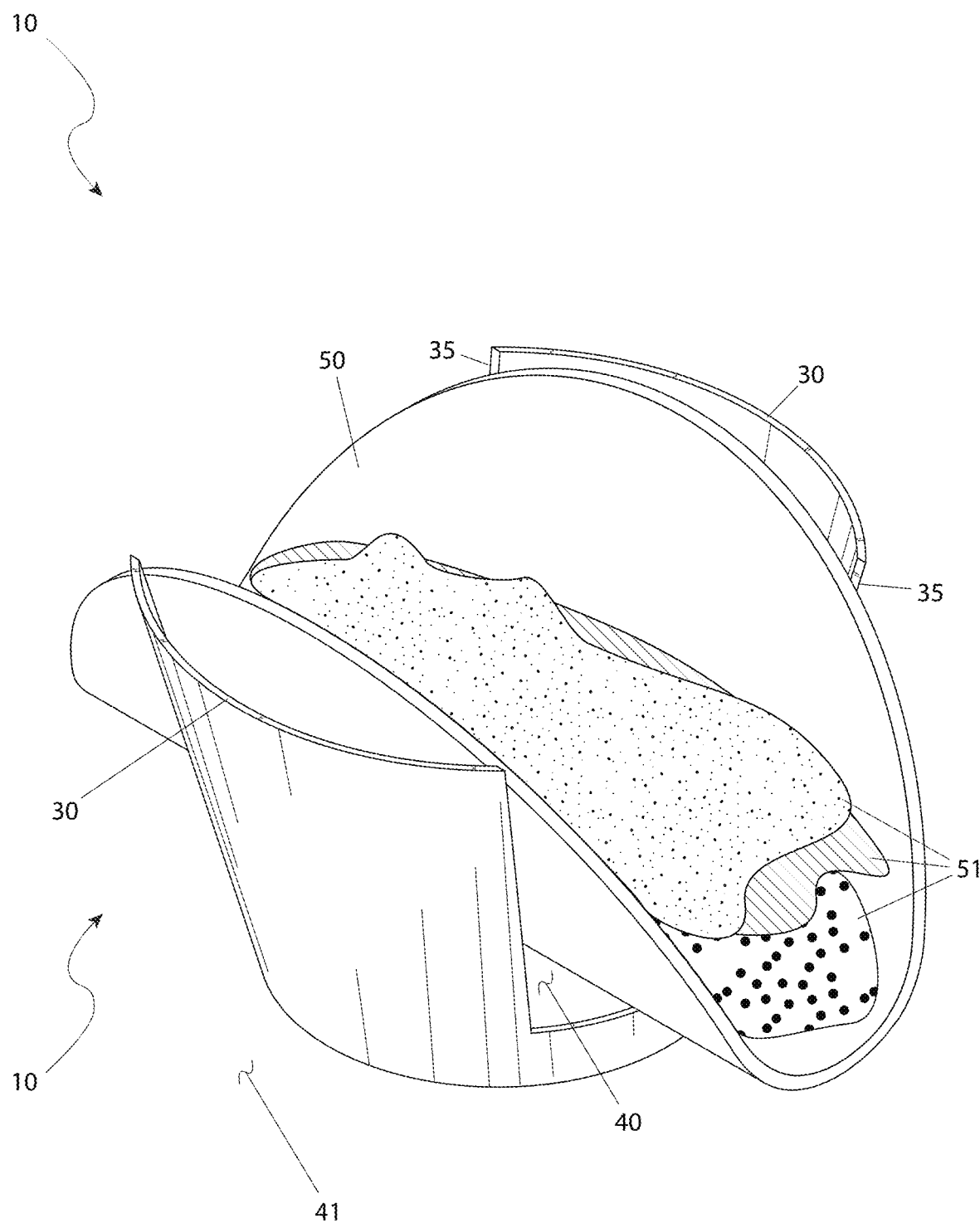
FIG. 1 is an environmental view of a taco holder 10 supporting a taco 50 on a vertical surface 45, according to an embodiment of the present invention.
Figure 4:
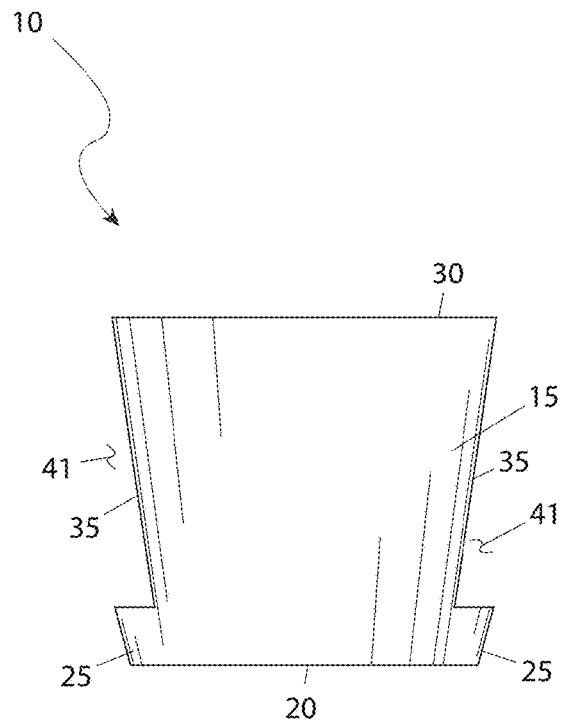
FIG. 4 is a side elevation view of the taco holder 10, according to an embodiment of the present invention.
Figure 6:
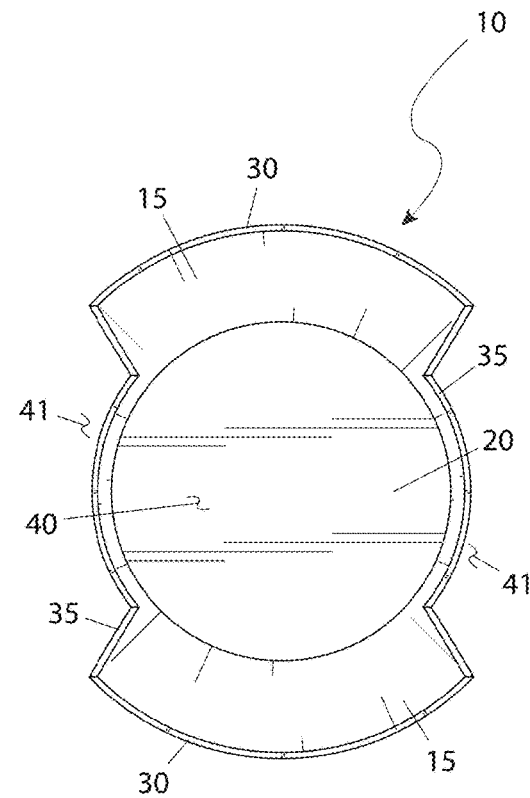
FIG. 6 is a top plan view of the taco holder 10, according to an embodiment of the present invention.
Figure 5:
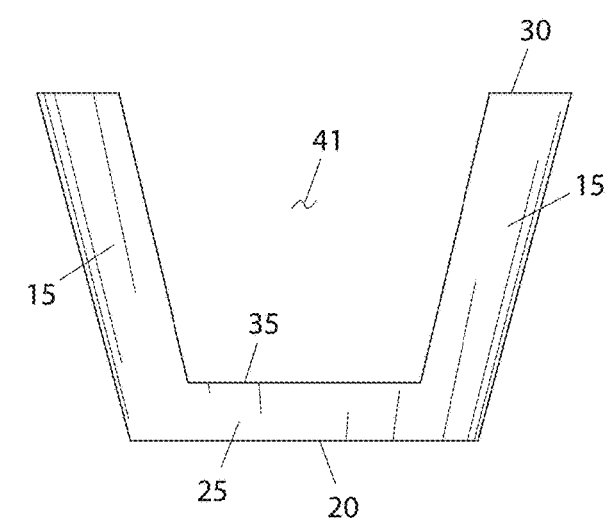
FIG. 5 is a front elevation view of the taco holder 10, according to an embodiment of the present invention.
Figure 7:
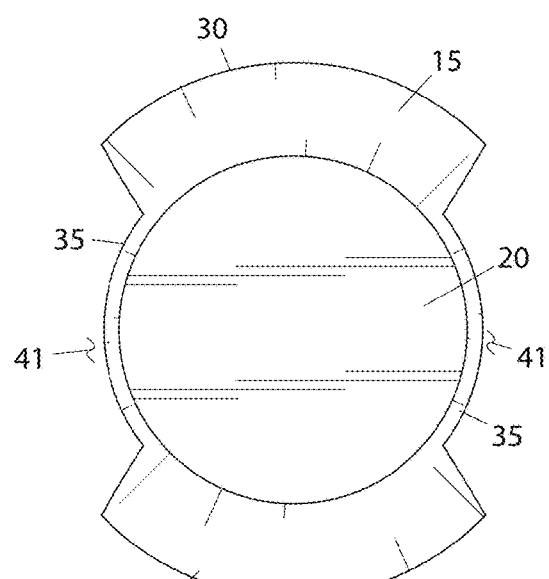
FIG. 7 is a bottom plan view of the taco holder 10, according to an embodiment of the present invention; and, FIG. 8 is a top front isometric view of a plurality of taco holders 10 disposed in a stacked configuration.

DESCRIPTIVE KEY 10 taco holder
15 side wall first portion
20 bottom wall
25 side wall second portion
30 holder rim edge
35 holder cut-out edge
40 interior
41 cut-out
45 support surface
50 taco
52 taco filling

1. DESCRIPTION OF THE INVENTION

Referring to FIG. 1, the present invention is directed to a taco holder 10 configured to hold a taco 50 filled with taco filling 52 in an upright position and parallel to a support surface 45 when supported thereon, such as a table top or similar structure. Although the taco holder 10 is particularly suited for holding a taco 50 in an upright position, either with or without taco filling 52, or during a filling process. Other edible and non-edible items may be supported in the taco holder 10. Referring now to FIG. 8, it can be seen that the geometry and shape of the taco holder 10 can enable a tack of taco holders 10 nesting within each other can be accomplished. This is desirable for space saving when stored.

Referring now to FIGS. 2-8, various views of the taco holder 10 are disclosed. The overall shape of the taco holder 10 comprises a tapered generally frusto-conical body where an open top end has a larger diameter than a closed bottom end and an interior 40 is defined therein. The taco holder 10 includes a holder rim edge 30 located at the terminal upper end thereof, and a bottom wall 20 located at the bottom end thereof. The bottom wall 20 is planar so that it can rest on a planar support surface 45. A pair of cut-outs 41 are located on diametrically-opposing locations on the taco holder 10, each identical in shape and depending downward from the holder rim edge 30 and terminate prior to the bottom wall 20. The pair of cut-outs 41 is further defined by a holder cut-out edge 35, which are portions of the holder 10 that are facing the respective cut-out 41. In the exemplary embodiment, the pair of cut-outs 41 have a generally trapezoidal shape and are sized to accommodate the width of a full hard taco shell 50 with taco fillings 52. The bottom edge of the cut-outs 41 is horizontal and parallel with the bottom wall 20.

A pair of side wall first portions 15 are each defined as the delimited portion of the taco holder 10 spanning the height between the holder rim edge 30 and the bottom wall 20 and bordered by the cut-outs 41. A pair of side wall second portions 25 are each defined as the delimited portion of the taco holder 10 that is not the pair of side wall first portions 15, essentially the portions immediately below the cut-outs 41.

In certain embodiments, the taco holder 10 can be manufactured out of plastic material, intended for repeated or one-time use and then discarded. Other materials can included processed paper, carboard stock, or other similar material based on manufacturing concerns. Preferably, the taco holder 10 can be manufactured out of a bio-degradable material without contributing to waste. If intended for reuse, the material of the taco holder is preferably capable of being cleaned in the dish washer.

In an embodiment consisting of the numbered elements, the taco holder 10 comprises a tapered frusto-conical body with an open top end of larger diameter than a closed bottom end, defining an interior 40. The holder includes a holder rim edge 30 at the terminal upper end, a planar bottom wall 20 at the bottom end for resting on a support surface 45, and a pair of diametrically-opposed trapezoidal cut-outs 41. Each cut-out 41 depends downward from the holder rim edge 30, terminates prior to the bottom wall 20, and is bounded by a holder cut-out edge 35, with the bottom edge of each cut-out 41 being horizontal and parallel to the bottom wall 20. The taco holder 10 further includes a pair of side wall first portions 15, each spanning vertically between the holder rim edge 30 and the bottom wall 20 and laterally bordered by the cut-outs 41, and a pair of side wall second portions 25 located below the cut-outs 41. The frusto-conical geometry of the holder 10 enables nested stacking with identical holders 10 for compact storage. This configuration exclusively incorporates the enumerated structural components to retain a taco 50 upright within the interior 40, suspended over the bottom wall 20 via engagement with the horizontal holder cut-out edges 35.

In use, the bottom wall 20 of the taco holder 10 can be placed on a support structure 45, such as a table or counter. A taco 50 with or without taco filling 52, or any other edible item, can be held within the interior 20 wherein at least a portion of each distal end thereof can rest on the horizontal holder cut-out edges 35 of the pair of cut-outs 41, spanning the distance between and suspended over the bottom wall 20 and retained within the interior 20. This is very beneficial during the filling process of the taco 50 with taco filling 52, or during the consumption process, thereby leaving one's hands free to accomplish other tasks instead of holding the taco 50. The interior of the taco holder 10 can also capture and retain any dropped taco filling 52, thereby contributing to cleanliness. The nesting capability of the taco holder 10 allows for space-saving storage when stored with other identically sized taco holders 10.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A taco holder consisting of:
   a tapered generally frusto-conical body defining an interior, the frusto-conical body having an open top end of larger diameter than a closed bottom end;
   a planar bottom wall disposed at the closed bottom end, the planar bottom wall being oriented in a plane perpendicular to a vertical support surface and configured to contact the support surface when the taco holder is mounted thereon so that the longitudinal axis of the frusto-conical body extends substantially horizontally in use;
   a holder rim edge circumscribing the terminal upper end of the open top end and providing structural reinforcement against deformation during stacking or handling;
   a pair of diametrically-opposed trapezoidal cut-outs formed through the frusto-conical body, each cut-out depending downward from the holder rim edge, terminating prior to the planar bottom wall, and bounded by a holder cut-out edge having a horizontal bottom edge parallel to the planar bottom wall;
   a pair of side wall first portions each spanning vertically between the holder rim edge and the planar bottom wall and laterally bordered by the respective cut-outs;
   a pair of side wall second portions each disposed below the respective cut-outs and integrally continuous with the side wall first portions;
   wherein the horizontal bottom edges of the cut-outs are configured to receive and support opposing distal ends of a taco such that the taco is suspended within the interior above and spaced from the planar bottom wall, thereby maintaining the taco in an upright orientation parallel to the vertical support surface and permitting taco filling to be inserted while minimizing contact with the holder;
   wherein the planar bottom wall is further configured to collect any taco filling that may fall from the taco during use;

wherein the frusto-conical geometry of the holder enables a plurality of identical holders to nest concentrically within each other for compact storage when not in use; and, wherein the holder is formed from a biodegradable or dishwasher-safe plastic, processed paper, or cardboard stock material of sufficient rigidity to support a filled taco without deformation, the holder consisting solely of the recited structural and material components.

* * * * *